(12) United States Patent  
Jacobs

(10) Patent No.: US 9,073,645 B2  
(45) Date of Patent: Jul. 7, 2015

(54) APPARATUS AND METHOD FOR RETRIEVING UNMANNED AERIAL VEHICLES

(71) Applicant: John T. Jacobs, Santa Barbara, CA (US)

(72) Inventor: John T. Jacobs, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 202 days.

(21) Appl. No.: 13/923,007

(22) Filed: Jun. 20, 2013

(65) Prior Publication Data

US 2013/0341462 A1   Dec. 26, 2013

Related U.S. Application Data

(60) Provisional application No. 61/662,151, filed on Jun. 20, 2012.

(51) Int. Cl.
*B64F 1/00* (2006.01)
*B64F 1/02* (2006.01)

(52) U.S. Cl.
CPC .............. *B64F 1/02* (2013.01); *B64C 2201/182* (2013.01)

(58) Field of Classification Search
CPC .............. B64C 39/024; B64C 2201/18; B64C 2201/182; B64F 1/02
See application file for complete search history.

(56) References Cited

U.S. PATENT DOCUMENTS

| 3,468,406 | A | 9/1969 | Spodig |
| 3,490,722 | A | 1/1970 | Schnarr et al. |
| 5,560,568 | A | 10/1996 | Schmittle |
| 6,874,729 | B1 * | 4/2005 | McDonnell ...................... 244/63 |
| 7,410,125 | B2 * | 8/2008 | Steele ........................ 244/110 E |
| 2004/0256519 | A1 * | 12/2004 | Ellis et al. .................. 244/110 E |
| 2006/0249623 | A1 * | 11/2006 | Steele ............................ 244/116 |

FOREIGN PATENT DOCUMENTS

| EP | 1 127 722 A1 | 8/2001 |
| WO | 2009/066073 A1 | 5/2009 |

OTHER PUBLICATIONS

International Search Report and Written Opinion for Application No. PCT/US2013/046838.

* cited by examiner

*Primary Examiner* — Philip J Bonzell
(74) *Attorney, Agent, or Firm* — Renner, Otto, Boisselle & Sklar, LLP

(57) ABSTRACT

A system and method for recovering unmanned aerial vehicles (UAVs) uses the fact that many small UAVs can hover in a vertical or near-vertical attitude. An exemplary system includes two or more rollers rotatable about respective axes of rotation, a mechanism to capture a UAV, and a support to which the rollers are mounted in such a way as to place the axes of rotation in parallel in a common plane. When the plane is in a vertical orientation, the capture mechanism is enabled to capture a UAV positioned adjacent the rollers. By hovering the UAV in the vertical position there is no forward velocity or momentum, and hence the craft can more easily be captured and the motor can be shut down without damaging the UAV. Misalignment during recovery is mitigated by cushioning in the rollers and the ability of the capture mechanism to compensate for imperfect alignment.

10 Claims, 5 Drawing Sheets

APPARATUS AND METHOD FOR RETRIEVING UNMANNED AERIAL VEHICLES

FIELD OF THE INVENTION

The present invention is related to an apparatus and method for retrieving unmanned aerial vehicles (UAVs), and more particularly to an apparatus and method for retrieving UAVs without a runway.

BACKGROUND

Small unmanned aerial vehicles (UAVs), including small airplanes, for example, can be launched and flown almost anywhere, even in places without a take-off or landing strip. At present, retrieval without a landing strip can be clumsy or awkward and potentially damaging to the UAV.

Current retrieval practices include flying into a net, flying into vegetation, capturing with a guide wire and hook arrangement, and belly-landing. Each of the above require a person in the field to retrieve the UAV. And there is the possibility of damage to the UAV when it runs into the net, misses the hook, or lands on its belly on rough terrain.

Another method is disclosed in U.S. Pat. No. 5,560,568. in which an aircraft is captured on a pillow using cooperating components of a hook-and-loop fastener.

SUMMARY

This invention provides a system and method for automatically recovering small UAVs, using the fact that many small UAVs can hover in a vertical or near-vertical attitude or orientation. Many UAVs are flown in a generally horizontal attitude or orientation, with a longitudinal axis generally aligned with the forward direction of flight, relying on airflow over wings to give lift and forward velocity and momentum. By hovering the UAV in the vertical position there is no forward velocity or momentum, and hence the craft can more easily be captured and the motor can be shut down without damaging the UAV.

While in a vertical orientation the UAV is captured by a vertically oriented cushion formed of multiple ropers and a capture device for capturing and holding the UAV that approaches and engages the rollers. As examples of suitable capture devices, each roller may be partially covered with cooperating elements of a hook-and-loop fastener, or a magnetic field can be generated adjacent the rollers, or arms can be extended to capture and hold position the plane on the rollers. Misalignment during landing is mitigated by the flexible, cushioning nature of the rollers and the ability of the selected capture device to compensate for imperfect alignment.

More particularly, the present invention provides a system for retrieving an unmanned aerial vehicle (UAV). The system includes two or more rollers rotatable about respective axes of rotation, a capture mechanism to capture a UAV, and a support to which the rollers are mounted. The rollers are mounted in such a way as to place the axes of rotation in parallel in a common plane, and when the plane is in a vertical orientation and a UAV is positioned adjacent the rollers, the capture mechanism is enabled to capture a UAV and hold the UAV against the rollers.

Additional features of the system can include one or more of the following: (a) the rollers each having a respective outer surface that cooperate to define a landing surface in a generally vertical plane; (b) the rollers being made of a resilient material; (c) the support being rotatable to position the rollers' axes of rotation in a horizontal plane; (d) the rollers having a circular cross-section; (e) the capture mechanism including a hook-and-loop fastener element associated with a portion of the circumference of at least one roller; (e) the capture mechanism including a magnet; (f) the capture mechanism including one or more arms that are extendable beyond a landing surface defined by an exposed outer surface of the rollers; and (g) the system including a UAV and a controller that is configured to control the flight of the UAV.

The present invention also provides a method for retrieving an unmanned aerial vehicle (UAV). The method includes the steps of (i) moving the UAV into a vertical orientation adjacent a mechanism to capture the UAV; and (ii) capturing the UAV against two or more rollers whose axes of rotation can be positioned in a vertical plane.

The method can further include the steps of (iii) rotating the rollers' axes of rotation into a horizontal plane, and (iv) rotating one or more rollers about its respective axis of rotation to release the UAV.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings,

DETAILED DESCRIPTION

The present invention provides a system and method for automatically recovering small UAVs, using the fact that many small UAVs can hover in a vertical or near-vertical attitude or orientation. Many UAVs are flown in a generally horizontal attitude or orientation, with a longitudinal axis generally aligned with the forward direction of flight, relying on airflow over wings to give lift and forward velocity and momentum, By hovering the UAV in the vertical position there is no forward velocity or momentum, and hence the craft can more easily be captured and the motor can be shut down without damaging the UAV.

While in a vertical orientation the UAV is captured by a vertically oriented cushion formed of multiple rollers and a capture device for capturing and holding the UAV that approaches and engages the rollers. As examples of suitable capture devices, each roller may be partially covered with cooperating elements of a hook-and-loop fastener, or a magnetic field can be generated adjacent the rollers, or arms can be extended to capture and hold position the plane on the rollers. Misalignment during landing is mitigated by the flexible, cushioning nature of the rollers and the ability of the selected capture device to compensate for imperfect alignment.

Figure 1:
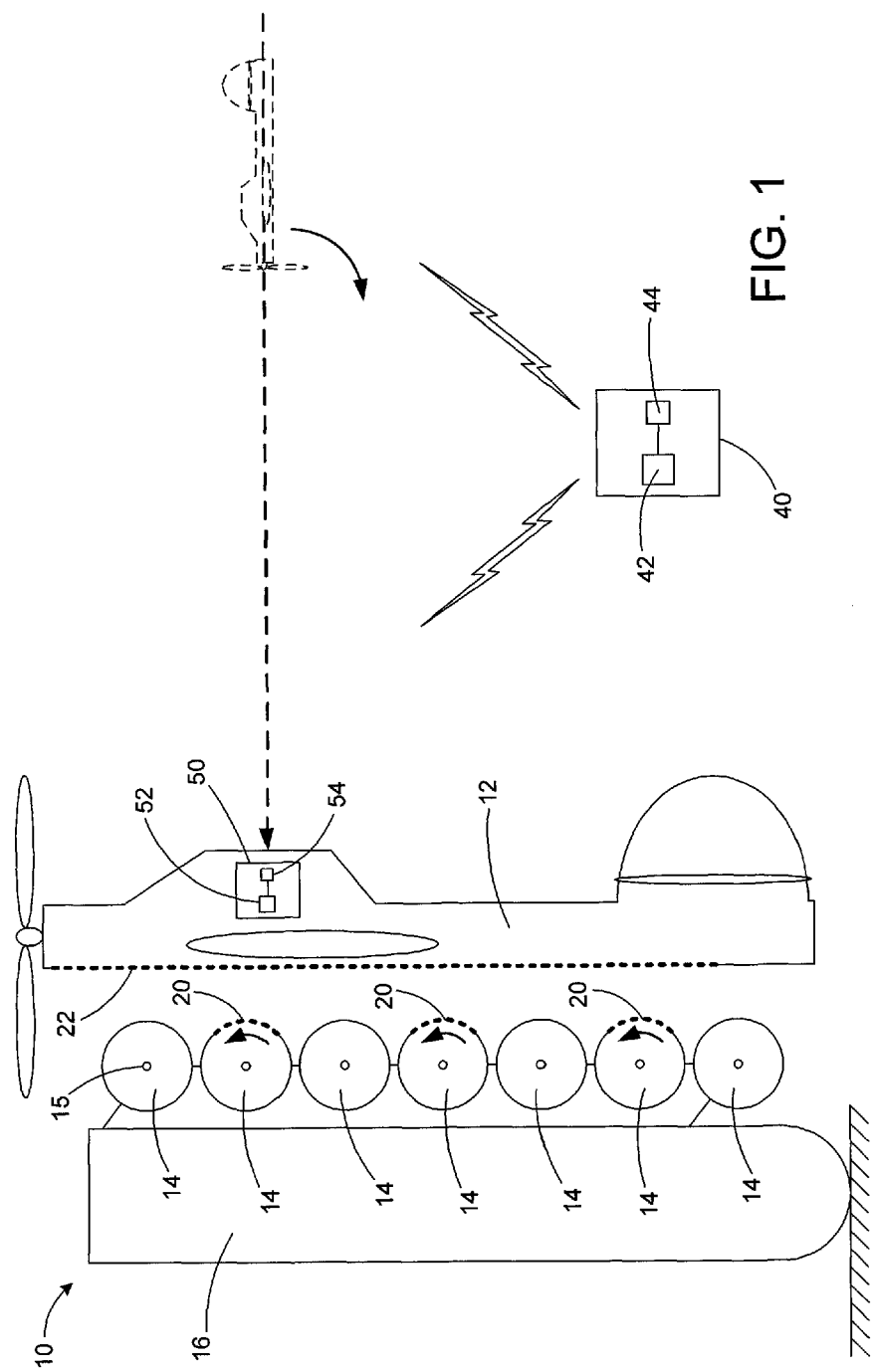
FIG. 1 is a schematic illustration of a system for retrieving a UAV in a vertical capture posture.
Figure 2:
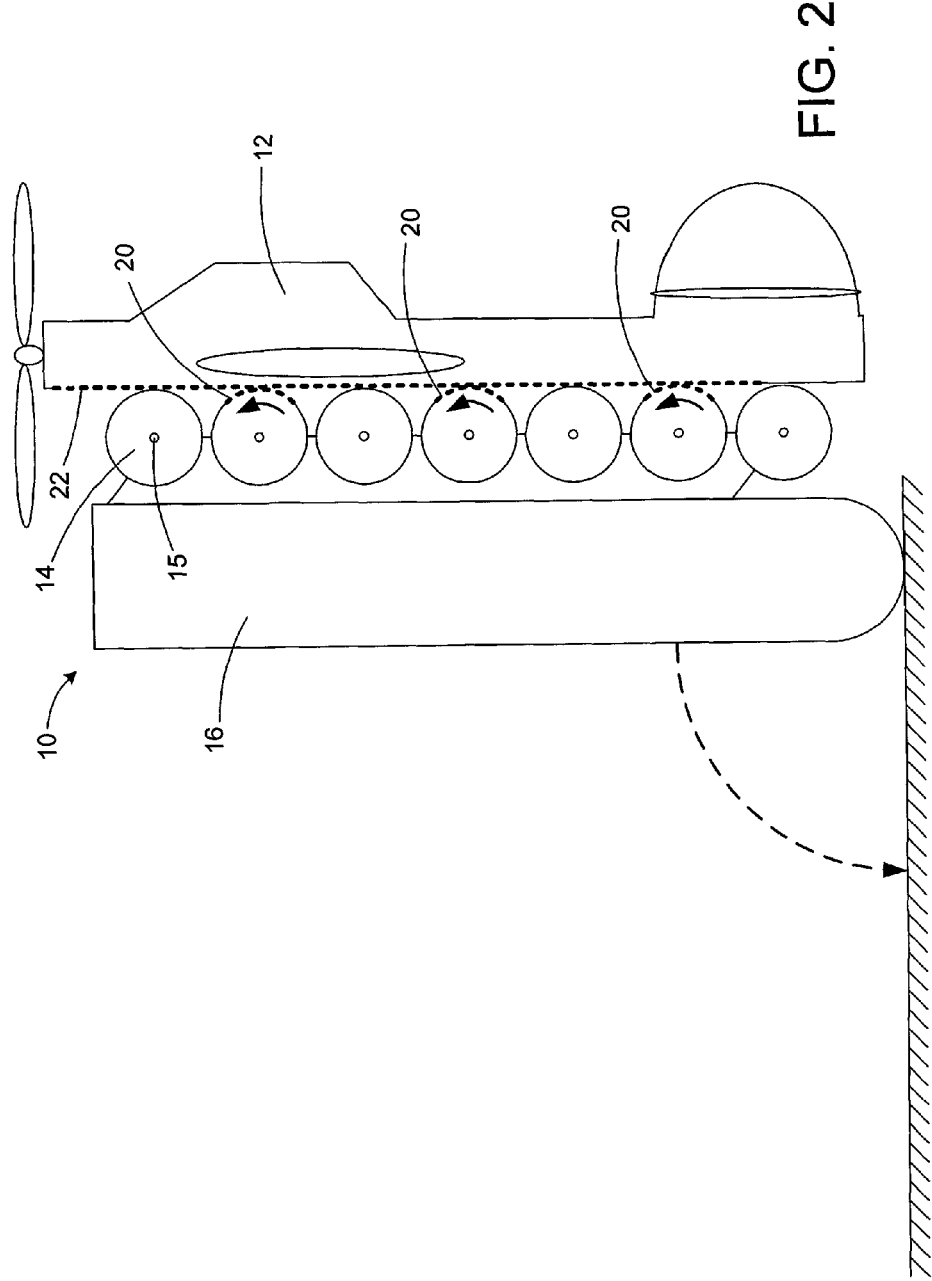
FIG. 2 is a schematic illustration of the system of FIG. 1 after capturing a UAV.
Figure 3:
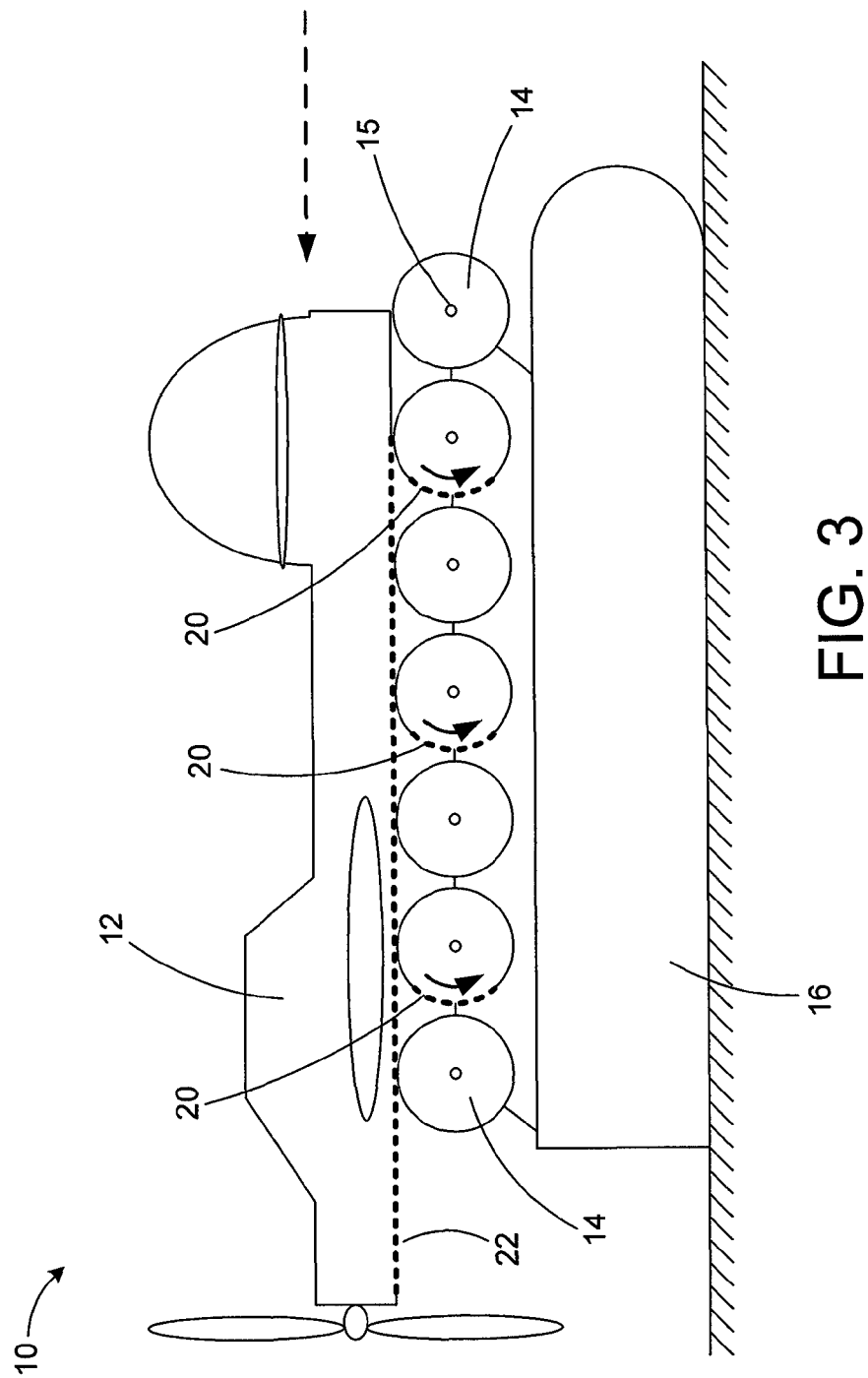
FIG. 3 is a schematic illustration of the system of FIG. 1 in a horizontal release posture.

Accordingly, the present invention provides a system 10 for retrieving a UAV 12, an example of which is shown in FIGS. 1-3. The system 10 includes two or more rollers 14 with respective axes of rotation 15 about which each roller 14 is free to rotate. Each roller 14 generally has a circular cross-section, and can be cylindrical, for example, or other shape with a circular cross-section. Each roller 14 can have the same cross-section along its length, meaning along the axis of rotation 15, or the cross-section can vary along its length. Additionally, each roller 14 can have one or more independently-rotatable segments spaced along the axis of rotation 15.

The rollers 14 are mounted to a common support member or support 16. Each roller 14 is freely rotatable relative to the support 16. The rollers 14 generally are lined up, side-by-side, with their axes 15 in a common plane, and with a generally parallel common plane lying tangential to an exposed surface of each roller 14.

When the roller axes 15 lie in a vertical plane, the exposed surfaces cooperate to define a landing surface for engagement with the UAV 12 and a landing plane generally tangential to multiple rollers 14.

The rollers 14 have a flexible, cushioning nature that allows the UAV 12 to be caught against the rollers 14 with minimal or no damage. To this end, the rollers 14 can be made of a resilient material, have a resilient structure, or be mounted to the support 16 in a resilient mounting arrangement, or a combination thereof, such that a UAV 12 can be caught against the rollers 14 with minimal or no damage. The resilient mounting arrangement can include springs, shock absorbers, and resilient materials. Additionally, the mounting arrangement for the rollers 14 can support all of the rollers 14 as a unit, or each roller 14 or roller segment can be individually supported. The system 10 also includes a mechanism to capture the UAV 12 when the UAV 12 is positioned adjacent the vertically-oriented rollers 14.

Figure 4:
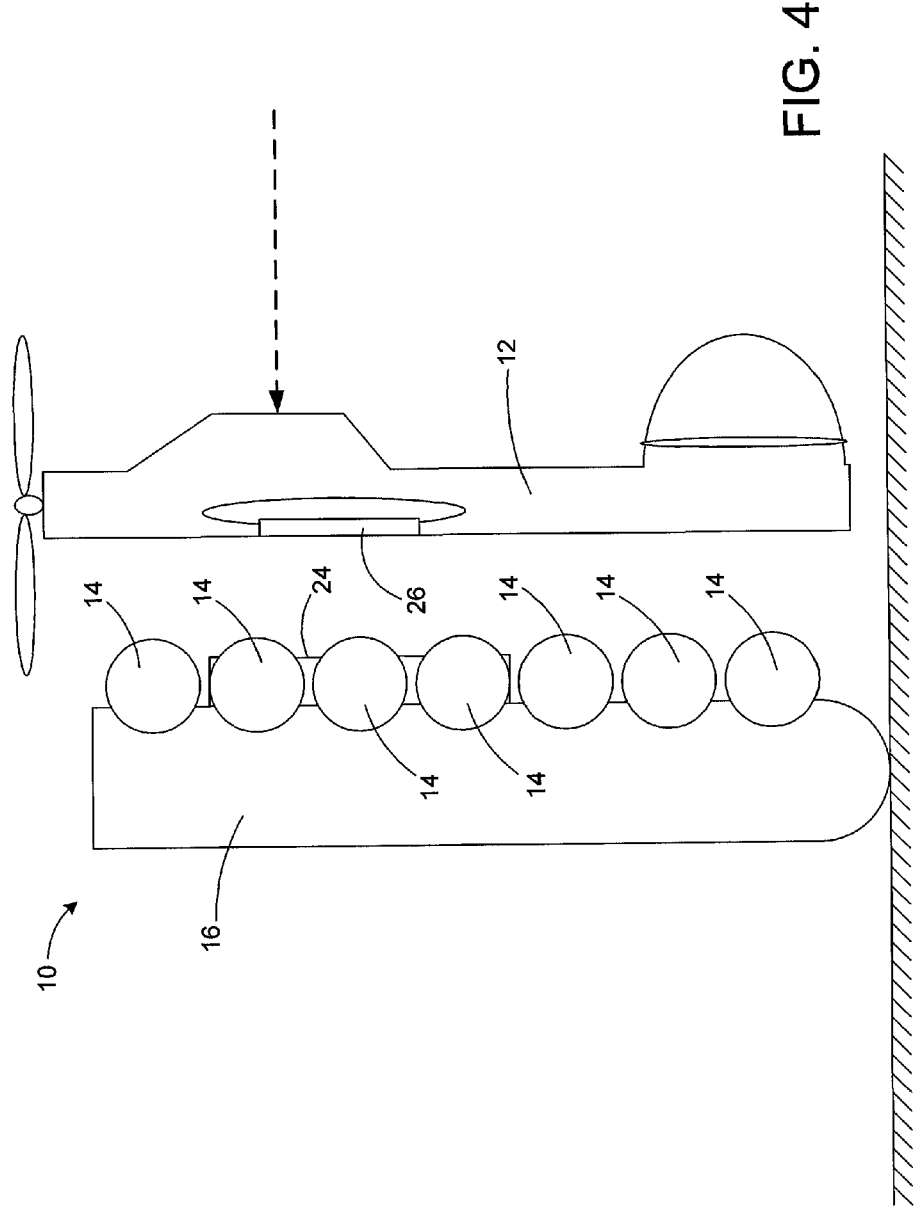
FIG. 4 is a schematic illustration of an alternative embodiment of a system for retrieving a UAV.
Figure 5:
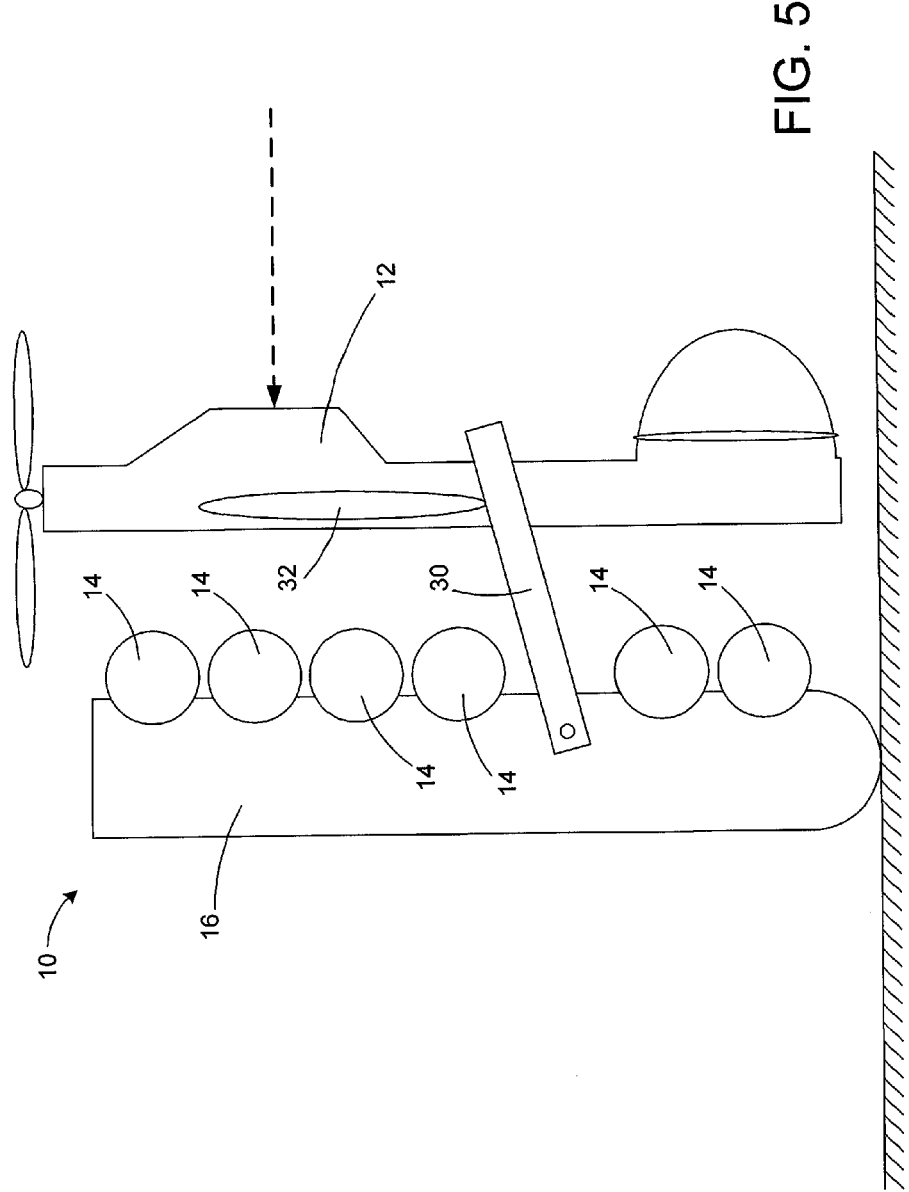
FIG. 5 is a schematic illustration of another alternative embodiment of a system for retrieving a UAV.

The mechanism or means for capturing the UAV can include cooperating hook-and-loop fasteners 20 and 22 on the UAV 12 and at least a portion of at least one roller 14 (FIGS. 1-3), a magnet 24 that can generate a magnetic field adjacent the rollers 14 and a receptive metal or other magnetic element 26 on the UAV 12 (FIG. 4), or arms 30 that can be extended beyond the landing plane defined by the exposed surface of the rollers 14 that cooperate with wings 32 or other features on the UAV 12 to capture and hold the UAV 12 in position against the rollers 14 (FIG. 5).

Regardless of the capture mechanism or device, misalignment during landing is mitigated by the flexible, cushioning nature of the rollers 14 and the ability of the selected capture device to compensate for imperfect alignment. Using generally cylindrical rollers 14 with a capture mechanism that is active along a length of the rollers 14, for example, does not require the UAV 12 to be perfectly lined up with the center of the rollers 14 for the UAV 12 to be captured. Additionally, the UAV 12 does not have to present a surface perfectly parallel to the landing plane defined by the exposed surfaces of the rollers 14 for the capture mechanism to engage and hold the UAV 12 against the rollers 14.

In the system 10 shown in FIGS. 1-3, only some of the rollers 14 include hook-and-loop fastener elements 20, and only a portion of the circumference of those rollers 14 is covered by the hook-and-loop fastener elements 20, with the remainder of each roller 14 being free of such a fastener. The rollers 14 can be weighted such that placing the array of rollers 14 in a vertical orientation causes the rollers 14 to automatically rotate to expose the fastener-covered portion of each roller 14, placing the fastener-covered portion of the rollers 14 in the landing plane.

The system 10 also can include a controller 40, which typically is remotely located and communicates with the UAV 12 wirelessly. The controller 40 generally includes a processor 42, such as a microprocessor, and a memory 44. The controller 40 is configured, either through the structural logic of the processor 42 or through software stored in the memory 44, to control the UAV 12 in its approach to the array of rollers 14. The controller 40 can communicate with a corresponding UAV controller 50 in the UAV 12. The UAV controller 50 has its own processor 52 and memory 54 configured for controlling the flight of the UAV 12 to the vicinity of the rollers 14.

Rotating a UAV from a generally horizontal orientation for general flight to a generally vertical orientation, and holding it in that orientation and moving the UAV into engagement with the array of rollers 14 for retrieval, is a difficult maneuver for many pilots. Consequently, the controller 40 and the UAV controller 50 can form part of an automatic control system (ACS) that automates the vertical-hover-landing of the UAV 12 using recorded control signals and position sensors. To land, the UAV 12 simply flies to a predetermined location, at which point the controller 40 takes control or an automated program of the UAV controller 50 takes over. The controller 40 or UAV controller 50 flies the UAV 12 into a vertical-hover, rotating the longitudinal axis of the UAV 12 from generally horizontal to a vertical orientation. When hovering, the UAV 12 remains at a substantially constant elevation or height above the ground. In coordination with feedback from one or more sensors (not shown) associated with one or both of the UAV 12 and the array of rollers 14, the controller 40 or the UAV controller 50 moves the UAV 12 into a capture position adjacent the cushioned rollers 14 where the capture mechanisms (such as the hook-and-loop fastener elements 20 and 22) engage and hold the UAV 12 against the rollers 14.

The UAV 12 can be controlled to automatically shut down once it is captured on the rollers 14. After capture, the cushioned rollers 14 and their support 16 can be rotated to a horizontal orientation, and the capture mechanism can release the UAV 12, thereby putting the UAV 12 in position to take off for another flight. Moving the UAV 12 forward or backward on the rollers 14 can cause the rollers to rotate, thereby disengaging the UAV 12 from the capture mechanism. In the case of a hook-and-loop fastener arrangement, for example, rotating the rollers 14, which are only partially (circumferentially) covered by one of the hook-and-loop fastener elements 20 or 22, releases the UAV 12 and allows the UAV 12 to take off on another flight. Alternatively, rotating the rollers 14 can activate a sensor or a switch that deactivates the capture mechanism, such as when the capture mechanism includes an electromagnet, as shown in FIG. 4.

In summary, the present invention provides a system and method for recovering unmanned aerial vehicles (AUVs) using the fact that many small UAVs can hover in a vertical or near-vertical attitude. An exemplary system includes two or more rollers rotatable about respective axes of rotation, a mechanism to capture a UAV, and a support to which the rollers are mounted in such a way as to place the axes of rotation in parallel in a common plane. When the landing plane is in a vertical orientation, the capture mechanism is enabled to capture a UAV positioned adjacent the rollers. By hovering the UAV in the vertical position there is no forward velocity or momentum, and hence the craft can more easily be captured and the motor can be shut down without damaging the UAV. Misalignment during recovery is mitigated by cushioning in the rollers and the ability of the capture mechanism to compensate for imperfect alignment.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

What is claimed is:

1. A system for retrieving an unmanned aerial vehicle (UAV), comprising:
    two or more rollers rotatable about respective axes of rotation;
    a capture mechanism to capture a UAV;
    a support to which the rollers are mounted in such a way as to place the axes of rotation in parallel in a common plane;
    wherein when the plane is in a vertical orientation and the UAV is positioned adjacent the rollers, the capture mechanism is enabled to capture the UAV and hold the UAV against the rollers; and
    where the capture mechanism includes a hook-and-loop fastener element associated with a portion of a circumference of at least one roller.

2. A system as set forth in claim 1, where the rollers each have a respective outer surface that cooperate to define a landing surface in a generally vertical plane.

3. A system as set forth in claim 1, where the rollers are made of a resilient material.

4. A system as set forth in claim 1, where the support is rotatable to position the rollers' axes of rotation in a horizontal plane.

5. A system as set forth in claim 1, where the rollers have a circular cross-section.

6. A system for retrieving an unmanned aerial vehicle (UAV), comprising:
    a UAV and a controller that is configured to control the flight of the UAV;
    two or more rollers rotatable about respective axes of rotation;
    a capture mechanism to capture the UAV;
    a support to which the rollers are mounted in such a way as to place the axes of rotation in parallel in a common plane; and
    wherein when the plane is in a vertical orientation and the UAV is positioned adjacent the rollers, the capture mechanism is enabled to capture the UAV and hold the UAV against the rollers.

7. A system as set forth in claim 6, where the controller is in the UAV.

8. A method for retrieving an unmanned aerial vehicle (UAV), comprising the steps of moving the UAV into a vertical orientation adjacent a mechanism to capture the UAV; and capturing the UAV against two or more rollers whose axes of rotation can be positioned in a vertical plane.

9. A method as set forth in claim 8, comprising the step of rotating the rollers' axes of rotation into a horizontal plane, and rotating one or more rollers about its respective axis of rotation to release the UAV.

10. A method as set forth in claim 8, where the moving step includes automatically controlling the UAV to rotate from a generally horizontal orientation to a generally vertical orientation and to hover at a substantially constant elevation.

* * * * *